United States Patent [19]
Pleiss, Jr. et al.

[11] 3,821,846
[45] July 2, 1974

[54] METHOD OF MANUFACTURING A MOTOR STATOR ASSEMBLY

[75] Inventors: Bernard J. Pleiss, Jr., Dayton, Ohio; Sam R. Von Krosigk, Mt. Sterling, Ky.

[73] Assignee: A. O. Smith Corporation, Milwaukee, Wis.

[22] Filed: Jan. 10, 1973

[21] Appl. No.: 322,526

[52] U.S. Cl.................... 29/596, 29/609, 310/45
[51] Int. Cl..................... H02k 15/02, H02k 15/12
[58] Field of Search........ 29/596, 598, 609; 310/42, 310/45, 217, 254

[56] References Cited
UNITED STATES PATENTS

| | | | |
|---|---|---|---|
| 3,408,734 | 11/1968 | Leahy et al. | 29/596 |
| 3,493,794 | 2/1970 | Hickle | 29/596 X |
| 3,512,902 | 5/1970 | Emmons et al. | 29/596 X |
| 3,518,754 | 7/1970 | Pleiss | 29/596 |
| 3,694,909 | 10/1972 | Hallerback | 29/596 |

Primary Examiner—Charles W. Lanham
Assistant Examiner—Carl E. Hall
Attorney, Agent, or Firm—Andrus, Sceales, Starke & Sawall

[57] ABSTRACT

A method of manufacturing a motor stator assembly is disclosed including the steps of stacking and aligning prepared laminations, inserting slot insulators to loosely confine the laminations, inserting windings and slot wedges to further confine the laminations along with the slot insulators, forming, connecting, insulating and lacing the windings and particularly the end turns, placing the wound laminations over an aligning arbor, bolting the wound laminations to an assembly ring, checking the face squareness and bolt torque, heating the compressed laminations at a temperature of 320° plus or minus 10° Fahrenheit for 1 ½ hours, placing an enclosure or tube over the winding output leads, conducting compressed air through the tube, dipping or immersing the wound laminations into an adhesive bonding material to permit bonding liquid to completely penetrate between the laminations, removing the enclosure or tube along with excessive bonding material, curing the bonding material to permanently bond the laminations, and removing the bonded, wound laminations from the assembly ring.

12 Claims, 10 Drawing Figures

PATENTED JUL 2 1974 3,821,846

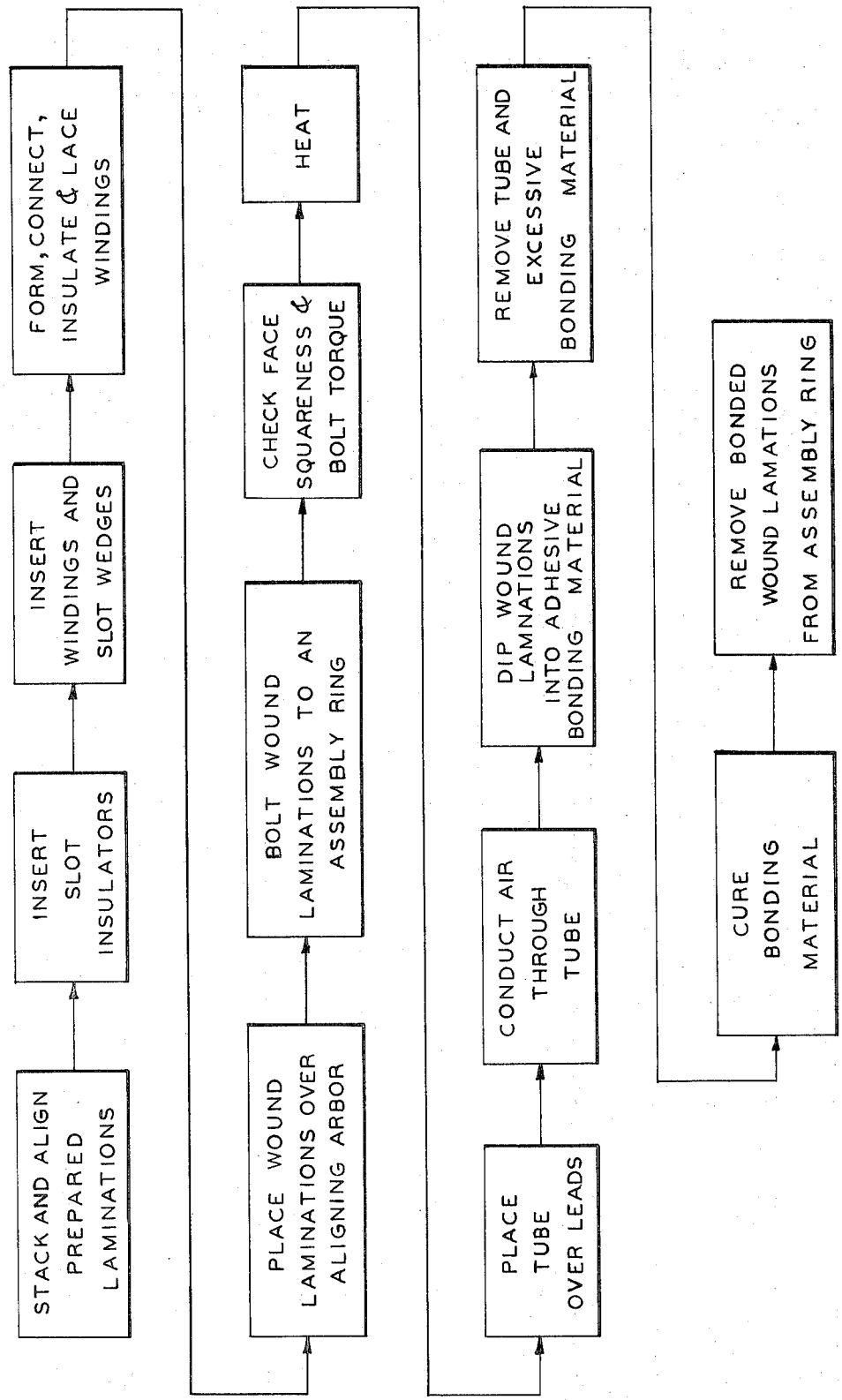

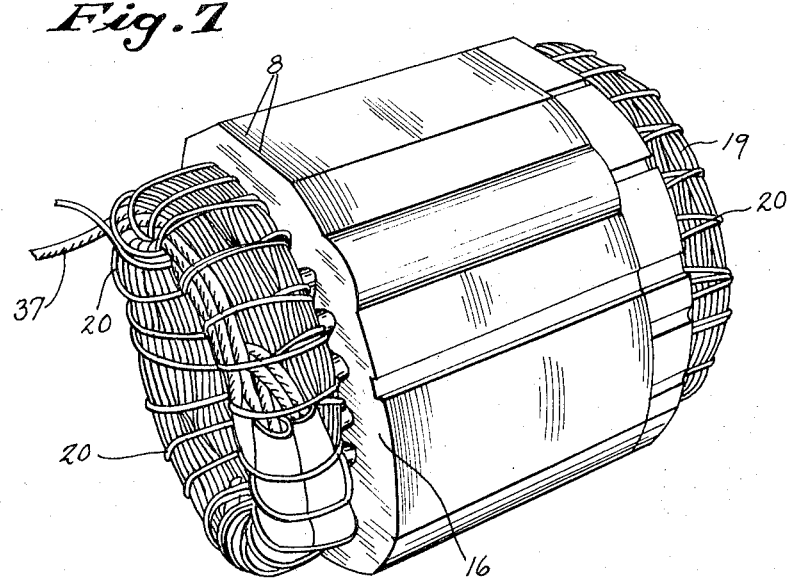
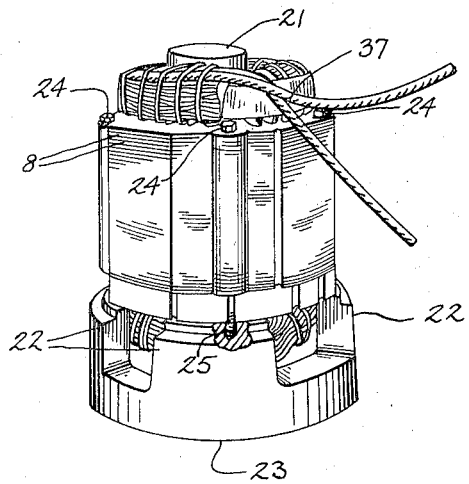
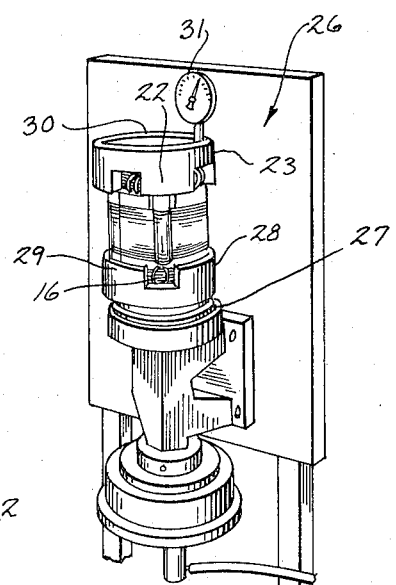
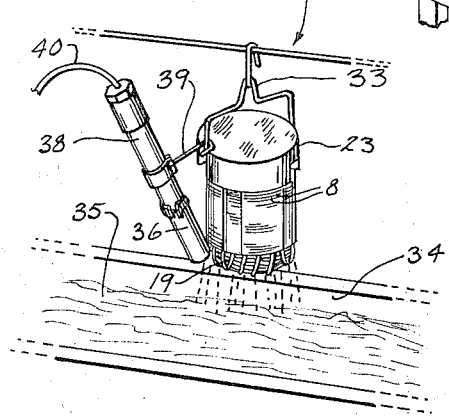

METHOD OF MANUFACTURING A MOTOR STATOR ASSEMBLY

This invention relates to a method of forming a wound stator core for use in a dynamoelectric machine which is fabricated from a plurality of laminations each having winding slots for receiving windings which are held together by an adhesive bonding material. Specifically, the invention relates to a method of forming a wound stator core in which a plurality of compressed, wound laminations are subjected to an adhesive bonding material which is permitted to flow by capillary action between and covering the inner faces of the laminations which also simultaneously provides an insulating and protective coating to the windings.

Inductive devices employing cores formed of a magnetic material are often formed of a laminated construction because of the improved magnetic and electrical characteristics. The core, particularly in motors, generators and the like, is provided with a plurality of slots within which the appropriate winding or windings are disposed.

Various highly satisfactory methods of interconnecting a plurality of laminations have been utilized wherein an adhesive in the form of an epoxy resin or the like is interposed between the laminations and acts as a bonding agent directly interconnecting the laminations and eliminating the requirement of clamping bolts, rivets, welds and the like, such as illustrated in U.S. Pat. No. 3,512,902, issued on May 19, 1970 to Emmons et al and assigned to a common assignee herewith. Such methods, however, have generally required that the plurality of laminations be permanently bonded together by the cured adhesive bonding material interposed between the laminations prior to the placement of windings within the winding slots of the laminations. Such methods have required additional costly steps of further treating the windings with varnish or other protective materials together with additional curing steps. Other methods have required additional steps for permanently securing the laminations together by axial welds, rivets, or the like to enable the movement of the laminations between processing stations prior to the application of the bonding material.

The present invention is particularly directed to an improved laminated structure which is formed in a novel manner by several steps in which the plurality of laminations are aligned and loosely confined by the insertion of windings within the winding slots. In some forms of the invention, the laminations are further confined and aligned by the insertion of slot insulators into the winding slots. Applicants have found that the loose confinement of the plurality of laminations by the slot insulators and windings conveniently permit the application of bonding material to both the laminations and windings within one step to bond and interconnect the laminations while further coating the windings with a desired insulation and further providing a very thin coating on the inner periphery of the teeth of the annular stator.

Generally, in accordance with the present invention, a method of forming a wound stator core is provided in which a plurality of prepared laminations are loosely stacked so that the winding slots are aligned. Thereafter, slot insulators are inserted into the winding slots to loosely confine the laminations followed by the insertion of windings within the insulated winding slots which further confine the laminations. The employment of slot insulators and windings within the loosely stacked plurality of laminations permits the convenient transfer of the core between the various processing stations and further permits the placement of windings at the earliest possible time. The plurality of loosely confined, wound laminations are thereafter clamped at a plurality of spaced locations so that an adhesive bonding material may be applied which is permitted to flow by capillary action between and covering the interfaces of the laminations and further coating the windings. Thereafter, the bonding material is set and the bonded, wound laminations are unclamped thus providing a highly satisfactory sealed, wound and laminated core unit.

In a preferred form of the invention, the laminations are formed from a matt finished cold rolled steel by a conventional punch press. The individual laminations are thereafter suitably annealed and steam blued which produces a relatively heavy scale or oxide coating on the matted surfaces of the laminations.

The prepared laminations are stacked upon an alignment arbor which aligns the corresponding winding notches and further inserts slot insulators into the winding slots. The insulators are cold formed from substantially rectangular sheets of polyester film and provide opposite ends which are folded approximately 180° to provide cuffs. The insulators with formed cuffs are further cold formed into a generally U-shaped and projected into the slots so that the cuffs are permitted to project axially outward of the outer face of the outermost laminations and further to project slightly radially outward beyond the slot to securely engage the faces of the outer laminations. Insulators such as polyester film are found highly satisfactory in that they provide a resiliency when cold formed to expand within the slots to substantially engage the inner walls thereof.

The interaction of the inserted slot insulators within the plurality of loosely mounted laminations provides a substantially self-supporting unit through the expanding interlocking action of the insulators within the respective slots together with the overlapping cuffs at both ends of the stack.

Windings are thereafter placed within the insulated slots of the plurality of loosely mounted laminations confined by the plurality of insulators. If desired, a plurality of insulating slot wedges are placed within each window adjacent the inside diameter of the stator to retain the windings within the slots which further coact with the insulators to fully insulate the windings. Applicants have found that the plurality of stacked, loosely confined laminations may be removed from the winding apparatus and remain in substantially stacked alignment by the confining forces within the plurality of slots provided by the plurality of slot insulators and the inserted windings.

After the windings have been inserted into the stator slots, the winding end turns are circumferentially formed, partly insulated and laced with appropriate winding leads interconnected in a conventional manner. The plurality of loosely stacked laminations secured by the plurality of insulators and windings are thereafter placed over an aligning arbor and are secured to an assembly ring by a plurality of through bolts which pass through aligned openings within the laminations and secured within threaded openings within the assembly ring. The laminations are subjected to a predetermined axial compression by the application of a predetermined torque to the plurality of through bolts. The assembly ring and the secured laminations are thereafter transferred to a mechanical testing apparatus at which the face squareness and bolt torque is checked and adjusted.

The stacked and compressed laminations which are secured to the assembly ring are thereafter transferred to an over and heated to a temperature of approximately 320° plus or minus 10° Fahrenheit for approximately 1½ hours. The heated compressed laminations mounted upon a movable carrier assembly are transferred to a core bonding station and are vertically dipped or immersed within an adhesive bonding material contained in a vat or the like.

Prior to immersion, a hollow enclosure or tube is clamped over the output leads of the windings. One end of the enclosure is elevated to an upper position and removably secured to a projection provided by the carrier assembly. A compressed gas such as air is thereafter conducted through the hollow inner portion of the enclosure during the immersion of the wound stator core assembly within the bonding material.

During immersion of the wound stator core assembly, the bonding material is permitted to completely penetrate between the laminations as a result of capillary action and fills throughout the matting surfaces of the adjacent laminations without regard to the clamping or mounting holes for the core unit. After a selected time period sufficient to insure adequate penetration of the bonding liquid, the carrier assembly operates vertically to remove the compressed laminations from the bonding material and retains the laminations above the vat for a sufficient period of time to permit excess bonding material to drain. Additional bonding material may thereafter be applied to the end turns which were not immersed. Excess bonding material may be wiped or otherwise removed from the outer lamination faces and exterior surfaces of the core and windings.

The passing of compressed gas such as air through the enclosure or tube surrounding the output leads during the immersion step prevents contact and adhesion of the bonding material to the output leads. Applicants have found that the conduction of air through the hollow enclosure or tube provides an efficient and economical method of preventing the output leads from being coated with adhesive material and assures their flexibility for connection when employed within a motor housing or the like.

After the excess bonding material has been removed, the enclosure or tube surrounding the output leads is unclamped and removed. A mist of air and varnish solid may then be sprayed on the wound core if desired. The plurality of wound and bonded laminations are thereafter placed within a suitable oven and heated to a selected working or setting temperature for a predetermined period of time to completely set the bonding material to permanently bond the laminations to each other and provide a bonded wound core. Preferably, the wound bonded laminations are baked for approximately five hours at a temperature of approximately 320° F. plus or minus 10° F. The bonded laminations and windings are thereafter removed from the assembly ring after curing by the removal of the through bolts.

The present invention thus provides a highly economical and improved method of making a sealed, wound laminated core unit by the application of bonding material to the plurality of wound laminations which permits the bonding material to flow between and cover the interfaces of the laminations and further coat the windings.

The drawings furnished herewith illustrate a preferred construction in accordance with the present invention disclosing the above advantages and features as well as others which will be readily understood by those skilled in the art from the following description.

In the drawings:

FIG. 2 is a flow diagram showing a preferred and novel method of forming the stator core of the present invention;

FIG. 7 is a perspective view of the loosely confined, wound stator laminations illustrating the end turn formations, connections, insulations and lacings;

FIG. 8 is a perspective view of the laminations of FIG. 7 mounted upon an aligning arbor and bolted to an assembly ring;

FIG. 9 is a perspective view of the assembly of FIG. 8 mounted upon a face squareness testing apparatus; and FIG. 10 is a perspective view of the assembly of FIGS. 8 and 9 movably mounted over a bath of adhesive material and showing the connection of an air conducting tube over the winding output leads.

Figure 1:
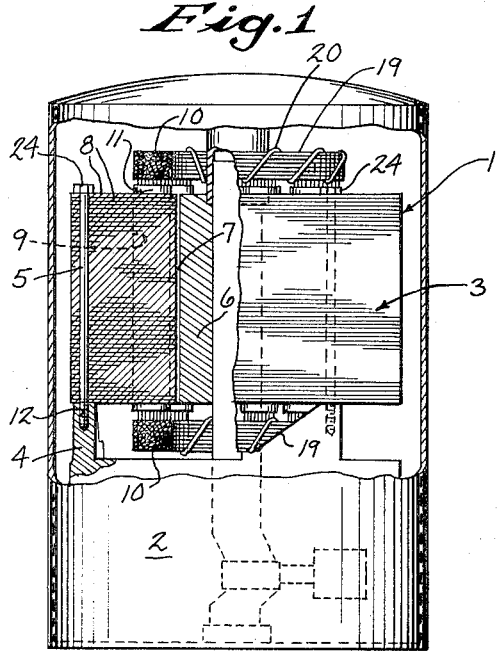
FIG. 1 is a diagrammatic illustration showing a refrigerant-compressor motor mounting construction employing a stator constructed in accordance with the present invention.

Referring to the drawings and particularly to FIG. 1, the motor 1 is mounted as part of a compressor 2. The motor 1 includes an annular stator unit 3 mounted directly on the compressor casting or housing 4 and held thereto by circumferentially distributed mounting bolts 5. A rotor 6 is rotatably mounted within the stator unit 3 and journalled within suitable fixed bearings, not shown, to provide precise alignment of the rotor 6 within the annular stator unit 3 with a predetermined air gap 7 therebetween.

The present invention is particularly directed to the forming of the stator unit 3 which generally includes a plurality of similar individual ring laminations 8 stacked to form a core. Each of the laminations 8 is provided with corresponding winding notches or slots 9 on the inner periphery to receive a winding 10. The stator winding 10 is inserted within the winding slots 9 with suitable slot insulators 11 disposed in the slots 9 and projecting slightly outward thereof to the opposite end faces of the stator core. The stator core rests directly on the compressor housing 4 and is tightly clamped thereto by the plurality of through-bolts 5 which extend through suitable openings in the outer diameter of the core and into corresponding threaded openings 12 in the housing 4.

The stator laminations 8, in accordance with the present invention, are interconnected by a bonding material on the inner faces of the laminations. As previously noted, the stator core is secured to the housing 4 under relatively high compressive forces to provide accurate location of the stator core with respect to the rotor 6 in order to maintain a uniform, concentric arrangement. This maintains a constant uniform air gap 7 between the stator core and the rotor 6 to provide the desired and necessary starting torque over long periods of time as long as the laminations 8 and particularly the bonding material remains intact.

The stator core is constructed in accordance with the following teaching constituting the subject matter of the present invention. Generally, the steps in the assembly are illustrated in the flow diagram of FIG. 2. The laminations 8 are preferably formed by a conventional punch process utilizing a matt finished cold rolled steel. The individual laminations 8 are preferably suitably annealed and steam blued which produces a relatively heavy scale or oxide coating on the matted surfaces of the laminations. A sufficient oxide coating is preferably produced on the laminations to substantially increase the electrical resistance when the laminations are mounted in a bonded stator construction.

Figure 3:
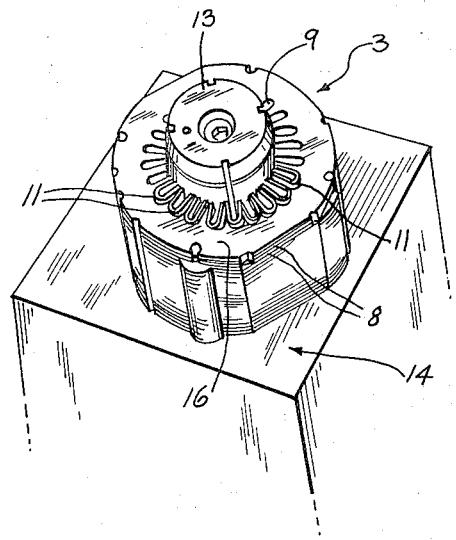
FIG. 3 is a perspective view of a plurality of stator laminations stacked upon a slot insulating machine arbor showing the insertion of several slot insulators.

The prepared laminations 8 are stacked upon an alignment arbor 13 provided by a slot insulator inserting machine 14 as illustrated in FIG. 3. The insertion machine 14 aligns the corresponding winding notches or slots 9 of the plurality of loosely mounted laminations 8 and thereafter inserts slot insulators 11 into the slots 9.

Figure 4:
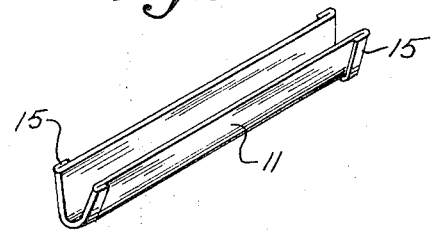
FIG. 4 is a perspective view showing one of the insulators inserted within the slots of the stator laminations shown in FIG. 3.

The insulators 11 are cold formed from substantially rectangular sheets of polyester film in which opposite ends are folded through approximately 180° to provide cuffs 15 as illustrated in FIG. 4. Although the insulators 11 are preferably made from polyester film, heavy paper or many other types of material having good insulating qualities could be utilized within the present invention. The insertion machine 14 operates in a well known manner to cold form the cuffs 15 and provide a generally U-shaped form for each insulator 11 as clearly illustrated in FIG. 4 and projects the resilient U-shaped insulators 11 into the slots 9 as illustrated in FIG. 3.

Figure 5:
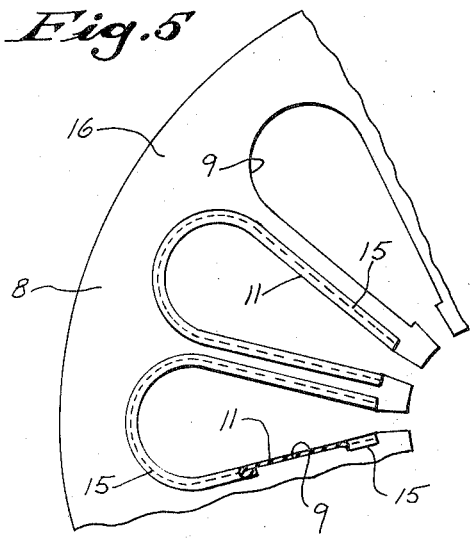
FIG. 5 is a fragmentary axial view of the stator laminations of FIG. 3 illustrating the assembly therewith of slot insulators.

When inserted, each cuff 15 projects axially outward of the outer face 16 of the outermost lamination 8 and also projects slightly radially outward beyond the slot 9, as illustrated in FIG. 5, to securely engage the lamination face 16. In actual practice, it has been found that polyester film insulators 11 provide sufficient resiliency when cold formed to expand within the slots 9 to substantially engage the inner walls thereof.

The interaction of the inserted slot insulators 11 within the plurality of loosely mounted laminations 8 provides a substantially self-supporting unit through the expanding interlocking action of the insulators 11 within the respective slots 9 together with the overlapping cuffs 15 at both ends of the stack. The plurality of loosely mounted laminations 8, confined by the plurality of slot insulators 11, may, therefore, be easily and conveniently removed from the insertion machine 14 and transferred to a winding station for the insertion of windings within the insulated slots 9.

The placement of windings within the slots of the plurality of loosely mounted laminations confined by the plurality of insulators 11 may be accomplished by any one of a number of techniques well known to those skilled in the art. Applicants preferably place the loosely mounted, confined laminations onto an insertion apparatus which temporarily secures the laminations substantially in alignment through the application of axial pressure. Pre-wound coils are thereafter placed into the insulated stator slots 9 by a coil transfer apparatus such as illustrated in U.S. Pat. No. 3,689,976, issued on Sept. 12, 1972 to Donovan, and assigned to a common assignee herewith.

Figure 6:
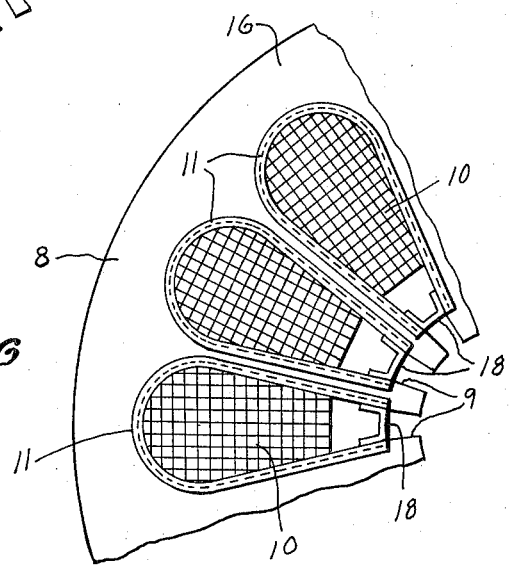
FIG. 6 is a fragmentary axial view of the stator laminations of FIGS. 3 and 5 showing the placement of windings and slot wedges.

The coils or windings 10 are shown in FIG. 6 within the slots 9 but insulated therefrom by the insulators 11. A plurality of insulating slot wedges 18 are wedged or placed in each window adjacent the inside diameter of the stator to retain the windings 10 within the slots 9 and further to coact with the insulators 11 to fully insulate the windings.

The plurality of stacked laminations 8 are removed from the winding insertion apparatus and are retained in substantial stacked alignment by the confining forces within the plurality of slots 9 provided by the plurality of slot insulators 11 and the windings 10.

Following the winding insertion step, the end turns 19 are circumferentially formed as illustrated in FIG. 7 to provide free axial clearance for permitting the entry of the rotor assembly 6. In addition, appropriate winding leads are interconnected in a conventional manner well known to those skilled in the art. The end turns of the windings are appropriately insulated, with the end turns secured by laces 20 to form substantial circumferential end turn rings extending beyond the outermost stator lamination faces 16.

The plurality of loosely stacked laminations 8 secured by the plurality of insulators 11 and the windings 10 are placed over an aligning arbor 21 and mounted upon four circumferentially spaced projections 22 of an assembly ring 23 as shown in FIG. 8. The aligned laminations 8 are secured by a plurality of through-bolts 24 which pass through aligned openings within the laminations 8 to be secured within threaded openings 25 formed in the projections 22. The laminations are subjected to a predetermined axial compression by the application of a predetermined torque to the plurality of through-bolts 24.

The assembly ring 23 having the secured laminations 8 mounted thereto is transferred to a mechanical testing apparatus 26 and placed about a rotatable arbor 27. A guide ring 28 provides four equally spaced projections 29 which engage the face 16 of the outer lamination 8 opposite to the assembly ring 23. The assembly ring 23 thus provides an outer circumferential surface 30 which is substantially aligned with the surface 16. During a test, the guide 28 is permitted to rotate so that a mechanical gauge 31 may detect the lamination face squareness; that is, the flatness of the end face of the assembly. The torque existing on the through-bolts 24 may also be checked and adjusted.

The stacked and compressed laminations 8 secured to the assembly ring 23 are removed from the arbor 27 and transferred to an oven. The compressed laminations are thereafter heated at a temperature of approximately 320° plus or minus 10° F. for approximately 1½ hours.

The heated compressed laminations 8 are transferred to a core bonding station generally indicated as 32 in FIG. 10. Specifically, the assembly ring 23 is removably mounted upon a movable carrier assembly 33 and is positioned so that the plurality of wound and compressed laminations 8 extend downwardly toward a vat 34 containing an adhesive bonding material 35. The bonding material is employed for connecting the laminations and preferably includes an epoxy resin in a suitable carrier with a solids content within the range of 10 to 12 percent to provide the desired shear strength. The specific gravity of the bonding material is preferably in the range of 0.935 to 0.942 at 70° F. which has been found to produce highly satisfactory results. Various other bonding materials and/or solids content, etc. could be used within the scope of applicants' invention.

Prior to the immersion of the compressed laminations 8 into the vat 34, a hollow enclosure or tube 36 is clamped over the output leads 37 extending from the windings 19. One end 38 of the tube 36 is elevated to an upper position and removably secured to a projection 39 which is connected to the carrier assembly 33. A gas conduit 40 is removably connected to the opening within end 38 of the tube 36 so that compressed gas or air may be passed through the hollow inner portion of the tube during immersion within the vat 34.

After securing the tube 36 over the leads 37, the carrier assembly 33 vertically operates to dip or immerse the compressed laminations 8 into the adhesive bonding material 35 and preferably permits the material 35 to submerge the outer face 16 of the uppermost lamination 8 by approximately one-eighth to one-fourth of an inch. The outer end 38 of tube 36 and the assembly ring 23 remain well above the bonding material 35 during the immersion step. The bonding liquid 35 completely penetrates between the laminations as a result of capillary action and fills throughout the mating surfaces of the adjacent laminations without regard to the clamping or mounting holes for the core unit.

The passing of compressed gas or air through the tube 36 during the immersion step prevents contact and adhesion of the bonding material to the output leads 37. Applicants have found that the conduction of air through the hollow tube 36 provides an efficient and economical method of preventing the output leads 37 from being coated with adhesive material and insures their flexibility for connection when employed within a compressor housing.

After a selected time period sufficient to insure adequate penetration of the bonding liquid, the carrier assembly 33 operates vertically to remove the compressed laminations 8 from the bonding material 35. The carrier assembly 33 retains the laminations 8 above the vat 34 for a sufficient period of time to permit excess bonding material to drain.

After a sufficient draining of the bonding material has occurred, the assembly ring 23 together with the connected bonded laminations 8 are removed from the carrier assembly 33 while additional bonding material may be applied to the end turns 19 which were not immersed.

Excess bonding material may be wiped or otherwise removed from the outer lamination faces and exterior surfaces of the core and windings. At this point, the tube 36 is unclamped and removed from the output leads 37. A mist of air and varnish solvent may then be sprayed on the wound core with excess material wiped off with a dry towel or the like.

The wound plurality of bonded laminations are thereafter placed within a suitable oven and heated to a selected working or setting temperature for a predetermined period of time to completely set the bonding material to permanently bind the laminations to each other and provide a bonded wound core. Preferably, the wound bonded laminations are baked for approximately 4 hours at a temperature of approximately 320° F. plus or minus 10° F.

The bonded laminations and windings are removed from the assembly ring 23 after curing by the removal of the through-bolts 24. The resulting stator assembly is thus ready for shipment or incorporation into a refrigerant-compressor structure such as by mounting upon a housing 4 and securing thereto by a plurality of mounting bolts 5, as illustrated in FIG. 1.

The present invention has been found to provide a highly reliable wound laminated core which will maintain excellent alignment of the plurality of laminations to provide a uniform air gap when mounted in a housing under high axial compressive loads. The present invention thus provides an improved method of making an impregnated wound laminated core unit which may particularly advantageously be utilized with a refrigerant-compressor.

Various modes of carrying out the invention are contemplated as being within the scope of the following claims particularly pointing out and distinctly claiming the subject matter which is regarded as the invention.

We claim:

1. In a method of forming a wound stator core, for use in a dynamoelectric machine, fabricated from a plurality of laminations each having winding slots for receiving slot insulators and windings which are held together by an adhesive bonding material, comprising the steps of loosely stacking the plurality of laminations and aligning the winding slots, inserting slot insulators into the winding slots to loosely confine the laminations, inserting the windings within the insulated winding slots to confine the laminations along with the slot insulators, clamping the plurality of loosely confined, wound laminations under a predetermined axial compression at a plurality of spaced locations, applying an adhesive bonding material to the wound, clamped laminations which flows by capillary action between the laminations and coats the interfaces of the laminations and the windings, setting the bonding material, and unclamping the bonded, wound laminations.

2. In the method of claim 1, and further including the step of heating the laminations and windings prior to the application of the bonding material.

3. In the method of claim 1, wherein the clamping step includes placing the wound laminations over an alignment arbor, passing bolts through aligned openings within the laminations at the plurality of spaced locations which are threaded into an assembly ring, and applying pre-selected axial pressure to the bolts at the spaced locations to provide said predetermined axial compression.

4. In a method of forming wound stator core, for use in a dynamoelectric machine, fabricated from a plurality of laminations each having winding slots for receiving windings which are held together by an adhesive bonding material, comprising the steps of loosely stacking the plurality of laminations and aligning the winding slots, inserting windings within the winding slots to loosely confine the laminations, clamping the plurality of loosely confined, wound laminations at a plurality of spaced locations under a predetermined axial compression, heating the laminations and windings, applying an adhesive bonding material to the wound, clamped laminations which flows by capillary action between the laminations thereby covering the interfaces of the laminations and coating the windings, setting the bonding material, and unclamping the bonded, wound laminations.

5. In the method of claim 4, wherein the heating step includes the maintenance of a temperature of 320° plus or minus 10° F. for 1½ hours.

6. In a method of forming a wound stator core, for use in a dynamoelectric machine, fabricated from a plurality of laminations each having winding slots for receiving windings which are held together by an adhesive bonding material with the windings having output leads extending outward from the laminations which are maintained substantially free of bonding material by the use of an enclosure comprising the steps of stacking the plurality of laminations, inserting the windings within the winding slots, placing an enclosure over the outwardly extending output leads, passing compressed gas through the enclosure to prevent bonding material from coating the output leads, applying an adhesive bonding material to the wound laminations which flows by capillary action between the laminations thereby covering the interfaces of the laminations and coating the windings without coating the output leads, removing the enclosure from the output leads, and setting the bonding material.

7. In the method of claim 6, wherein the step of applying bonding material includes immersing the wound laminations within a supply of the bonding material.

8. In the method of claim 7, including the step of elevating one end of the enclosure to remain above the supply of bonding material.

9. In a method of forming a wound stator core, for use in a dynamoelectric machine, fabricated from a plurality of laminations each having winding slots for receiving slot insulators and windings which are held together by an adhesive bonding material with the windings having output leads extending outward from the laminations which are maintained substantially free of bonding material by the use of an enclosure, comprising the steps of loosely stacking the plurality of laminations and aligning the winding slots, inserting slot insulators into the winding slots to loosely confine the laminations, inserting the windings within the insulated winding slots to confine the laminations along with the slot insulators, clamping the plurality of loosely confined, wound laminations at a plurality of spaced locations under a predetermined axial compression, placing an enclosure over the outwardly extending output leads, applying an adhesive bonding material to the wound, clamped laminations which flows by capillary action between the laminations thereby covering the interfaces of the laminations and coating the windings without coating the output leads, removing the enclosure from the output leads, setting the bonding material, and unclamping the bonded, wound laminations.

10. In a method of forming a wound stator core, for use in a dynamoelectric machine, fabricated from a plurality of laminations each having winding slots for receiving slot insulators and windings which are held together by an adhesive bonding material with the windings having output leads extending outward from the laminations which are maintained substantially free of bonding material by the use of a tube, comprising the steps of loosely stacking the plurality of laminations and aligning the winding slots, inserting slot insulators into the winding slots to loosely confine the laminations, inserting the windings within the insulated winding slots to confine the laminations along with the slot insulators, clamping the plurality of loosely confined, wound laminations at a plurality of spaced locations, placing the tube over the outwardly extending output leads, conducting a compressed gas through the tube to prevent bonding material from coating the output leads, applying an adhesive bonding material to the wound, clamped laminations which flows by capillary action between the laminations thereby covering the interfaces of the laminations and coating the windings without coating the output leads, removing the tube from the output leads, setting the bonding material, and unclamping the bonded, wound laminations.

11. In the method of claim 10, wherein the bonding material application step includes immersing the wound laminations within a supply of bonding material.

12. The method of claim 9, and including the step of forming, insulating and lacing the winding end turns and further interconnecting appropriate windings prior to applying an adhesive bonding material.

* * * * *

UNITED STATES PATENT OFFICE
CERTIFICATE OF CORRECTION

Patent No. 3,821,846            Dated August 29, 1974

Inventor(s) BERNARD J. PLEISS, JR. and SAM R. VON KROSIGK

It is certified that error appears in the above-identified patent and that said Letters Patent are hereby corrected as shown below:

Column 3, line 10, cancel "over" and substitute therefor ---oven---

Signed and sealed this 5th day of November 1974.

(SEAL)
Attest:

McCOY M. GIBSON JR.
Attesting Officer

C. MARSHALL DANN
Commissioner of Patents